June 11, 1940.  E. DULCHIN  2,203,947
FUR TRIMMING PLATE AND COMPOSITE FUR
Filed Dec. 14, 1937
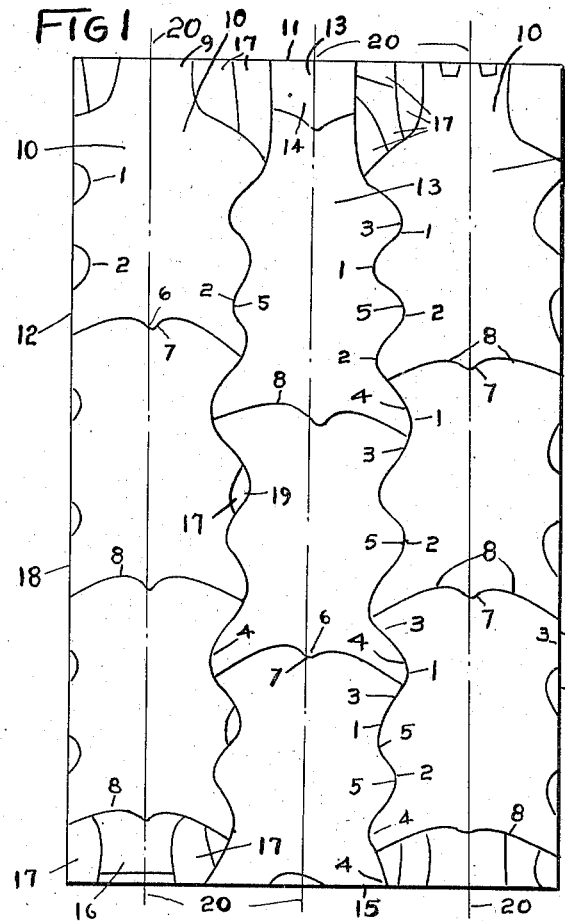
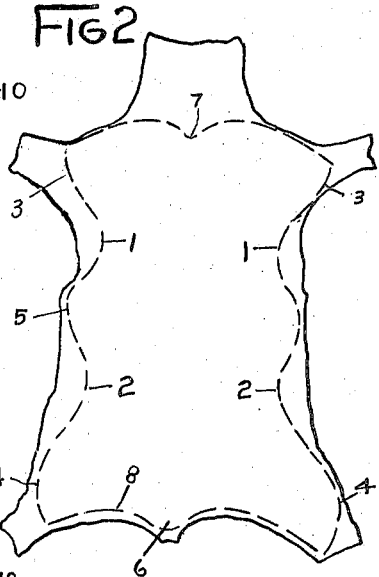
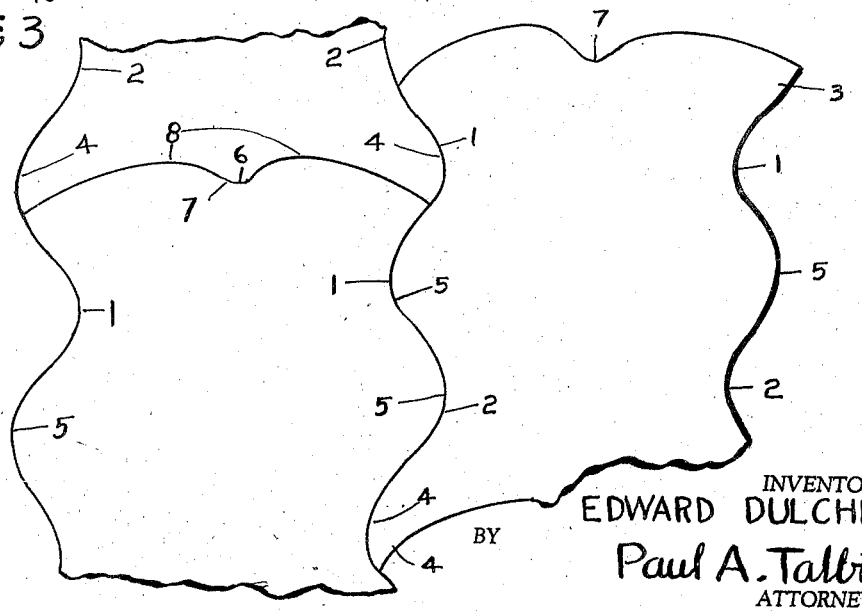
INVENTOR.
EDWARD DULCHIN
BY Paul A. Talbot
ATTORNEY.

Patented June 11, 1940

2,203,947

UNITED STATES PATENT OFFICE 2,203,947

FUR TRIMMING PLATE AND COMPOSITE FUR

Edward Dulchin, New York, N. Y.

Application December 14, 1937, Serial No. 179,722

7 Claims. (Cl. 149—28)

My invention particularly relates to assembling furs into plates of furs and the combining of furs into a composite piece comprising a number of furs and has among its objects to provide:

A saving of areas of each pelt ordinarily wasted.

A plate of furs more attractive in appearance yet less costly to produce.

A new method of assembling furs.

Pelts aligned longitudinally in their assembly.

I accomplish these and other objects by the construction and method herein described and shown in the accompanying drawing forming a part hereof in which:

Fig. 1 is a plate of composite furs, skins or fur skins.

Fig. 2 is a pelt showing the characteristic trimming line.

Fig. 3 is a fragmentary view showing a typical assembly.

Similar reference characters refer to similar parts in the drawing and in the description to follow.

Numerous methods have been employed in an attempt to utilize to a greater extent the maximum of area of each pelt and particularly the area having the good portion of the fur of each skin. By my invention the heavy furred or hairy portions and usable fur on the skin, and the unusable thick edged part of the pelt are trimmed with a minimum waste.

The assembly of the pelts into a plate of furs vary from trimming each pelt into a rectangle to cutting away not only a slight portion of the paw but a part of the shoulders and rump, so that a greater part of the neck, legs, belly are used in order to retain the maximum of the complete and good portion of the back.

My invention is particularly valuable in conserving the good portions of the fur when assembled into plates and for the manufacture of assembled furs into garments and trimmings and is directed to cutting, trimming and assembling the furs so that the shoulders, paws, bellies and rump fit into cut away portion of the shoulders, flanks, belly and rump.

It is well known that the flanks and slight portions of the belly and rump are the least valuable because of lack of both hair and thickness of skin. Most furs are the result of the animal being skinned and cut longitudinally from tail to head and somewhat transversely along the inner side of the legs (paw portions) so that the less valuable fur portions become the center line of dissection and when removed from the animal and stretched out flat the less valuable parts form the outer border of the pelt and the contour of the flat pelt is irregular.

This irregularity of contour however is not as great as that of the trimmed pelt after cutting away the less desirable portions of the fur skin which is particularly in evidence behind the fore legs and in front of the hind legs because of the flanks and belly.

The fur when trimmed has deep depressions 1 at the portions and areas of less desirable fur which are at the flank and also the deep depressions 2 at the belly and the shoulders and paws project at 3 while the rump and paws project at 4 so that when the furs are arranged the projections 3 are cut to join the depressions 1 and the depressions 2 receive the projections 5. The tail projection 6 engages the neck depression 7 and the shoulder projection engages the rump depression 8.

The neck 9 is cut away except on the top row of skins 10 bordering along the top edge 11 of the plate 12 as well as the alternate row of furs 13 just below the top edge of the plate where a part of a neck 14 is added to fill in.

Along the bottom edge 15 of the plate the rows of skins 10 are filled in with the whole necks 16. The spaces at the side of the necks of each row 10 are filled in with the pieces 17 of good fur trimmed from the pelt in fitting the skins in assembling the plate.

Along the side edges 18 of the plate and in the uneven places 19 between the skins likewise are fitted pieces 17 to fill in the plate to the desired shape. Thus substantially all of the useable fur is utilized in making up the plate of skins.

It will be noted that the general border between the rows of skins 10 and 13 is a scalloped or sinuous line and that one of the rows is fitted in staggered longitudinal relationship to the rows adjoining it. By the longitudinal is meant lengthwise of the skin or from neck to tail as a centerline 20 drawn through the center of the back of each skin is in alignment with the skin above or below it in each row.

Each row of skins however is not horizontally in alignment as the skins in one row are raised or lowered as may be seen by referring to Figure 1 so that the projecton in the scalloped or sinuous line bordering one row in general fit into the depressions in the border line of the next row. The border line due to the variation in the size and shape of the skins or furs usable in making up the plate of skins however may vary in some instances so that pieces are added to fill in the difference in the shape of the skins, and to size the plate as desired.

I have herein disclosed my method and construction of a plate of skins in detail and it will be apparent to one skilled in the trimming of skins that the details may be modified to suit skins of various kinds and sizes and for plates and wearing apparel of various styles and designs. I therefore do not wish to be limited to the detail herein disclosed as I may wish to modify and depart therefrom within the scope of the appended claims which set forth my invention.

I claim:

1. In an assembly of fur skins, rows of skins in longitudinal alignment having a sinuous border line separating the skins of one row from the skins in the row adjoining, said skins in one row joining the skins of another row along said sinuous border line, the projections of each alternate row of skins raised to engage the depressions of the adjacent row along said sinuous border.

2. In an assembled plate of fur skins, rows of skins in longitudinal alignment having a scalloped border line separating the skins of one row from the skins in the row adjoining, said skins in one row staggered and joining the skins of another row along said scalloped border line, the projecting parts of each row engaging the receding parts of the adjacent rows, said plate of skins having one set of alternate rows in which the skins nearest a border line have necks forming parts of said border line and a second set of alternate rows in which the skins nearest said border line have neck pieces, trimmed from skins not near said border line, pieced in on their necks to form other parts of said border line.

3. In an assembled plate of fur skins, rows of skins in longitudinal alignment having a sinuous border line separating the skins of one row from the skins in the row adjoining, said skins in one row joining the skins of another row along said sinuous border line in staggered relationship, said plate of skins having the necks of one set of alternate rows of skins forming a part of its upper border line, and necks of skins trimmed from the rows of skins secured to the tail ends of the lowermost skins in said set of rows.

4. In an assembly of fur skins, rows of skins in longitudinal alignment having a sinuous border line separating the skins of one row from the skins in the row adjoining, said skins in one row joining the skins of another row along said sinuous border line in staggered relationship, the plate so formed having the tail ends of the skins in alternate rows of skins forming a part of the border of said plate of skins.

5. In an assembly of fur skins, rows of skins in longitudinal alignment having a sinuous border line separating the skins of one row from the skins in the row adjoining, said skins in one row joining the skins of another row along said sinuous border line in staggered relationship and pieces of skins joining the sinuous border of said rows of skins to form a straight border line of said assembly of skins.

6. In a method of assembling fur skins, the cutting and securing together of rows of skins in which the head end of one skin is joined to the tail end of another skin and a sinuous border line is formed between said rows of skins and joining one row to the row adjacent, the shoulder and paw projections of one row of skins engaging the flank depressions of the adjacent row.

7. In a method of assembling fur skins, the cutting and securing together of rows of skins in which the head end of one skin is joined to the tail end of another skin and a scalloped border line is formed between said rows of skins and joining one row to the row adjacent, the flank and belly depressions of one row receiving the shoulder and rump projections of the adjacent row of skins and securing pieces of skin to said rows of skins to piece out the inner scalloped lines and to form straight border lines.

EDWARD DULCHIN.